United States Patent [19]

Schumacher

[11] 4,440,469
[45] Apr. 3, 1984

[54] OPTICAL WAVEGUIDE CONNECTOR

[75] Inventor: William L. Schumacher, Hershey, Pa.

[73] Assignee: AMP Incorporated, Harrisburg, Pa.

[21] Appl. No.: 188,395

[22] Filed: Sep. 18, 1980

[51] Int. Cl.³ .............................................. G02B 7/26
[52] U.S. Cl. .................................................. 350/96.20
[58] Field of Search ............... 350/96.20, 96.21, 96.22

[56] References Cited

U.S. PATENT DOCUMENTS

| 3,861,781 | 1/1975 | Hasegawa et al. | 350/96.21 |
| 3,999,837 | 12/1976 | Bowen et al. | 350/96.22 |
| 4,140,366 | 2/1979 | Makuch et al. | 350/96.22 |
| 4,140,367 | 2/1979 | Makuch et al. | 350/96.22 |
| 4,183,619 | 1/1980 | Makuch | 350/96.21 |
| 4,190,317 | 2/1980 | Makuch | 350/96.20 |
| 4,204,306 | 5/1980 | Makuch | 29/281.5 |
| 4,303,304 | 12/1981 | Ruiz | 350/96.20 |
| 4,368,948 | 1/1983 | Despouys | 350/96.20 |

FOREIGN PATENT DOCUMENTS

| 8941 | 3/1980 | European Pat. Off. | 350/96.21 |
| 11561 | 5/1980 | European Pat. Off. | 350/96.21 |
| 2841720 | 4/1980 | Fed. Rep. of Germany | 350/96.20 |

Primary Examiner—John D. Lee
Attorney, Agent, or Firm—Adrian J. LaRue; Richard B. O'Planick

[57] ABSTRACT

An SMA-style optical waveguide connector is disclosed comprising a tubular contact body receiving a conical profiled primary ferrule therein. The primary ferrule includes a profiled bore for receiving an optical waveguide therethrough, with a forward end segment of the waveguide protruding forward from the primary ferrule and out of a forward end of the contact body. An alignment ferrule is mounted over the forward end of the contact body, and provides a centrally disposed aperture to receive and axially center the forward end of the optical waveguide. The alignment ferrule is resiliently and radially compressible, so that upon force fitting the contact body into a tubular splice bushing, the alignment ferrule radially compresses to position the contact body on the major axis of the splice bushing.

9 Claims, 7 Drawing Figures

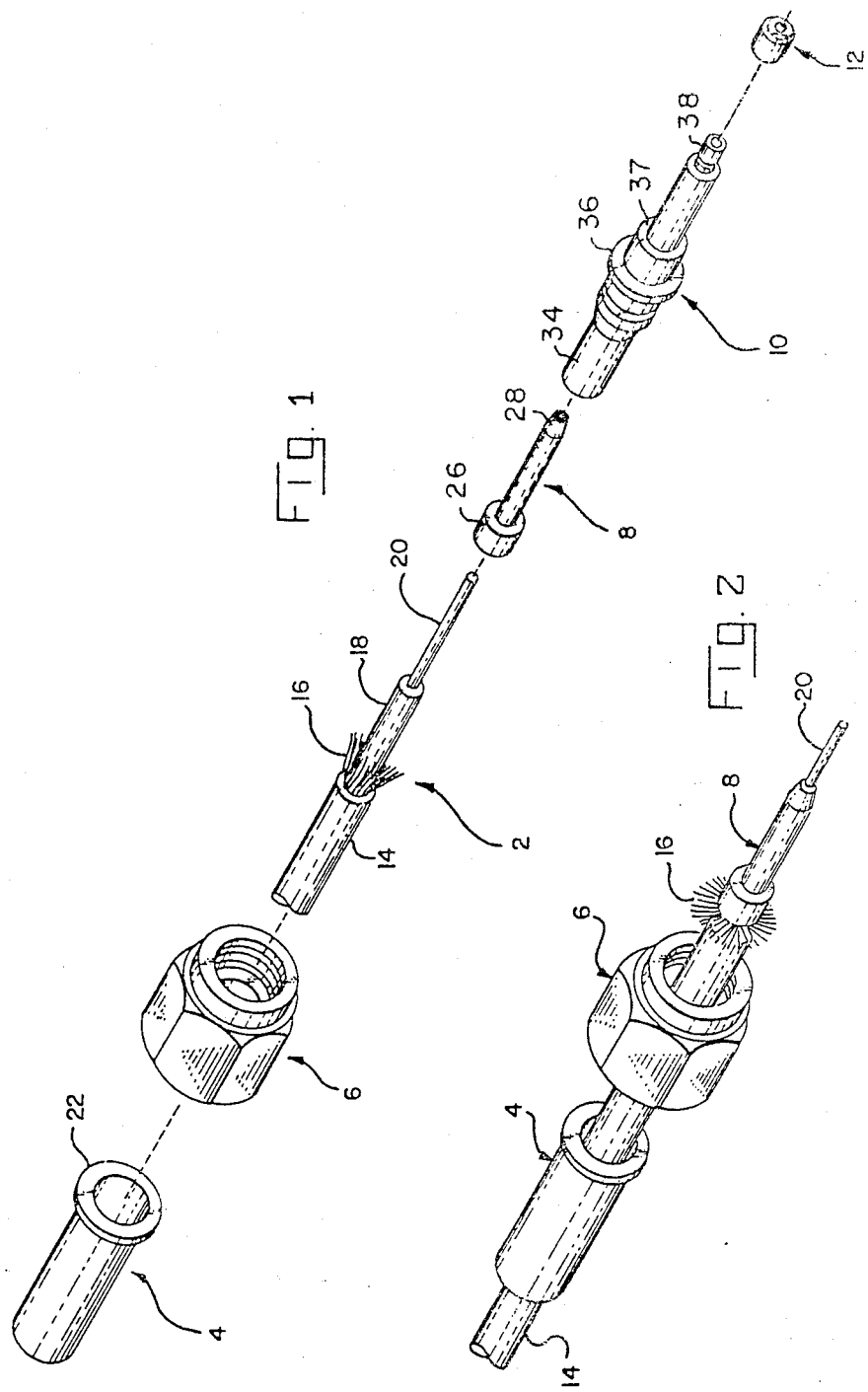

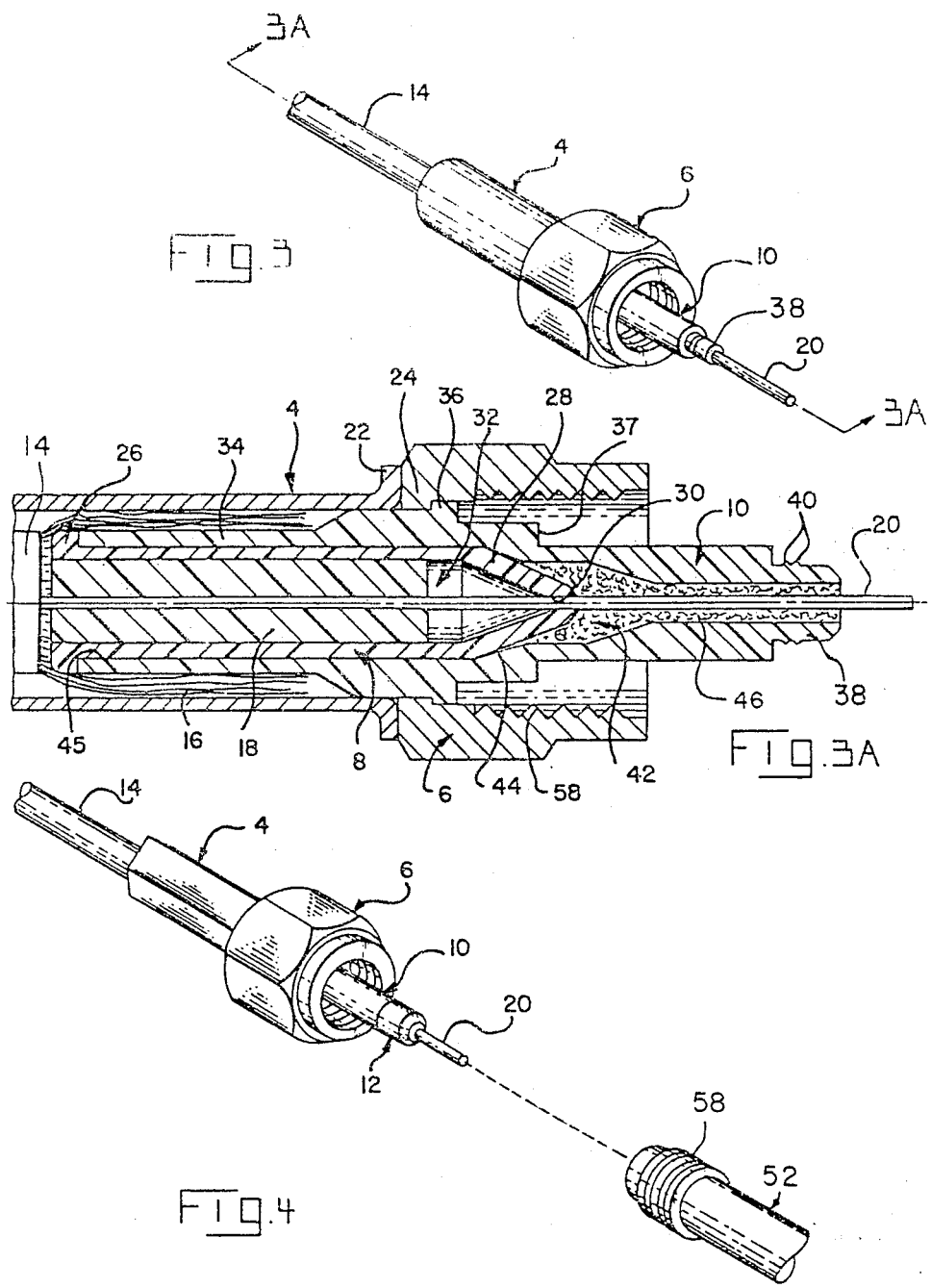

OPTICAL WAVEGUIDE CONNECTOR

BACKGROUND OF THE PRESENT INVENTION

1. The Field of the Present Invention

The present invention relates to optical waveguide connectors for effectuating the mechanical and optical coupling of a pair of waveguides. Specifically, the present invention relates to an optical waveguide connector of this general type having an SMA-styling.

2. The Prior Art

Currently available connectors for coupling optical waveguides generally comprise means for coaxially positioning the waveguide so that colinear alignment with a second waveguide may be achieved. A typical SMA-style optical waveguide connector for coupling a pair of waveguides is disclosed in U.S. Pat. No. 4,204,306. As disclosed therein, a resilient jig is provided and aligned relative to a connector so that the jig bore is concentric to the outer dimension of the connector terminal end. A resilient jig is uniformly compressed to cause the jig bore to contract about an optical fiber. Resultingly, the optical fiber is held in concentric alignment to the outer dimension of the terminal end and there awaits a subsequent application of adhesive material.

While the above connector generally centers the fiber, certain shortcomings prevent this approach from representing an ideal solution to the industry's needs. First, in positioning the axis of the waveguide in concentric alignment to the outer dimension of the connector terminal end, the effectiveness of an optical coupling is dependent upon one's success in preserving tight tolerances between the terminal end of the connector and the inner diameter of a splice bushing. Secondly, the above connector does not provide any structural means for confining the bonding agent to the forward terminal end of the optical waveguide. Consequently, the probability exists for the bonding agent to migrate down the cable, increasing the rigidity of the cable and therefore the likelihood that breakage would occur.

Accordingly, the industry has been in need of an SMA-style optical waveguide connector that can efficiently couple and colinearly align a pair of optical waveguides. Such a connector, preferably, should function relatively independent of part-to-part tolerance variations; should provide improved means for centering an optical waveguide in the contact; and should provide structural configuration for localizing the application of adhesive material. Moreover, since the intended market application for this type of connector would typically require the repeated mating and unmating of connector units in a field environment, each matable connector unit should comprise a relatively few number of component parts, and should require relatively straight-forward termination tooling.

SUMMARY OF THE PRESENT INVENTION

The present invention provides an SMA-style optical waveguide connector comprising a tubular contact body having an axial passageway profiled for receiving a primary ferrule therein, and further profiled for retaining the primary ferrule at a rearward location. The primary ferrule receives an optical waveguide therethrough, with a forward end segment of the waveguide being adapted to protrude forward from a forward end of the contact body. An alignment ferrule is provided, which is configured to mount over the forward end of the contact body and receives a forward segment of the optical waveguide, with a forward end surface of the waveguide referenced coplanar to the forward face of the alignment ferrule. The alignment ferrule is adapted for force fit insertion into a splice bushing, whereupon the alignment ferrule radially compresses to coaxially position the axis of the contact body on the axis of the splice bushing. The insertion of a pair of connectors so configured into opposite ends of a splice bushing, achieves colinear alignment of the pair of contact bodies, and resultingly effectuates axial alignment of their respective optical waveguides. In addition, the forward end of the primary ferrule and the inner profile of the contact body passageway are structured to interfit, thus preventing any migration of adhesive material from the forward terminal end of the connector assembly.

Accordingly, it is an object of the present invention to provide an SMA-style optical waveguide connector for achieving positive optical and mechanical interconnection of two optical waveguides.

It is a further object of the present invention to provide an optical waveguide connector comprising relatively few component parts.

Still further, it is an object of the present invention to provide an optical waveguide connector featured having improved means for centering the axis of an optical waveguide in a contact, and the axis of a contact in a splice bushing.

Still further, it is an object of the present invention to provide an optical waveguide connector which eliminates the criticality of part-to-part tolerances.

Yet a further object of the present invention is to provide an optical waveguide connector featured having means for localizing the application of adhesive material.

A still further object of the present invention is to provide an optical waveguide connector which is economically and readily produced.

These and other objects, which will become apparent to one skilled in the art, are achieved by a preferred embodiment which is described in detail below and which is illustrated in the accompanying drawings.

BRIEF DESCRIPTION OF THE ACCOMPANYING DRAWINGS

FIG. 1 is an exploded perspective view of the subject optical waveguide connector.

FIG. 2 is a perspective view of the subject optical waveguide connector in a partially assembled condition.

FIG. 3 is a perspective view of the subject optical waveguide connector in a condition of partial assembly subsequent to that illustrated in FIG. 2.

FIG. 3A is a longitudinal section view through the partially assembled connector illustrated in FIG. 3, taken along the line 3A—3A.

FIG. 4 is a perspective view of the subject optical waveguide connector, with the centering alignment ferrule affixed to the forward end of the contact body, and the optical waveguide projecting therethrough.

DETAILED DESCRIPTION OF THE PREFERRED EMBODIMENT

Figure 5:
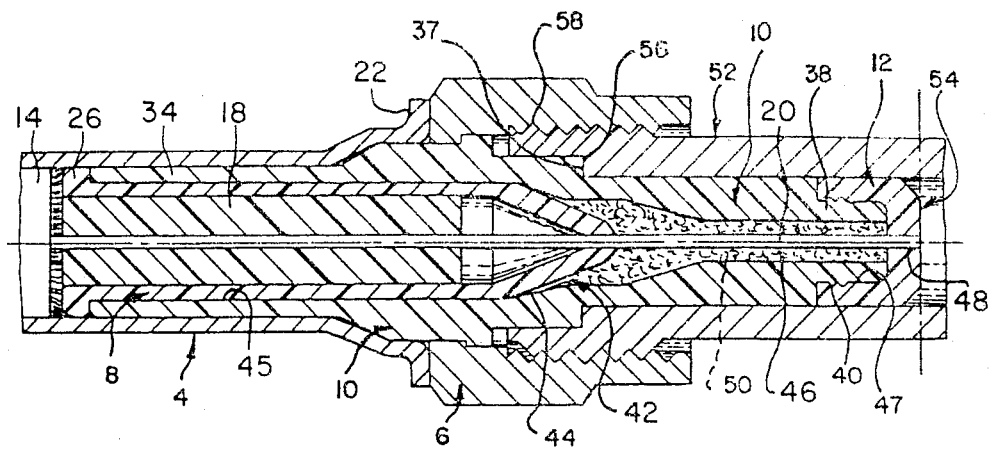
FIG. 5 is a longitudinal section view through a fully assembled optical waveguide connector terminated into a splice bushing pursuant to the teachings of the present invention.

Referring first to FIG. 1, the subject connector assembly 2 is illustrated as comprising a crimping ferrule 4, a coupling nut 6, a primary ferrule 8, a contact body 10, and an alignment ferrule 12. The subject invention is intended to terminate an optical waveguide of the general type comprising an outer jacket 14, a coaxial sleeve of strength fibers 16, an inner jacket 18, and an optical fiber 20.

With continued reference to FIGS. 1 and 3A, the crimping ferrule 4 includes a forwardly disposed external annular flange 22. The coupling nut 6 is configured to provide an internal annular flange 24 at a rearward end thereof. The primary ferrule 8 likewise provides an annular shoulder 26 at a rearward end thereof, and an inwardly tapered forward end 28. An aperture 30 extends through the forward end 28 of the primary ferrule, and is dimensioned to substantially the diameter of the optical waveguide 20. The primary ferrule 8 further includes an axial passageway 32 extending the length thereof, which passageway being dimensioned to closely receive the optical waveguide 20 having the inner jacket 18 therearound.

The contact body 10 is configured having a rearward tubular sleeve portion 34, an external outwardly directed annular flange 36, and a forwardly directed annular shoulder 37. The contact body 10 further includes a small dimensioned forward nose portion 38, having circumferential interference protrusions 40 formed therearound. An axial bore 42 extends the entire length of the contact body 10, and consists of a rearward, generally larger diametered portion 45 which tapers forwardly toward a forward bore chamber 46. Inwardly tapered sidewalls 44 define the portion of the axial bore 42 between the larger dimensioned rearward portion and the small bore chamber 46.

As best shown by FIG. 5, the alignment ferrule 12 is of a general cylindrical configuration, including a larger diametered counter bore portion 47 communicating with a small dimensioned centering aperture 48. It will be appreciated that the centering aperture 48 is dimensioned to closely receive the optical waveguide 20 therethrough and the counter bore inner diameter is dimensioned to enable the alignment ferrule 12 to be mounted over the forward nose portion 38 of the contact body 10. The alignment ferrule 12 is intended to be formed from a resilient, radially compressible material, for example a thermosetting plastic. The contact body 10, coupling nut 6, and crimping ferrule 4 may be formed from any one of a number of suitable metals. The primary ferrule 8 is intended to be formed of plastics material, but may be of a metallic composition if so desired.

Referring now to FIGS. 1, 2, and 3A, the assembly of the subject optical waveguide connector proceeds as follows. The optical waveguide cable assembly is inserted first through the crimping ferrule 4 and the coupling nut 6. Thereafter, the optical waveguide 20 is inserted through the forward aperture 30 of the primary ferrule 8 to project forwardly therefrom a distance. The inner jacket 18 of the waveguide cable is positioned within the axial passageway 32 of the primary ferrule 8 as shown. Subsequently thereto, the primary ferrule 8 is inserted into the rearward larger diametered portion 45 of the contact body axial bore 42. The tapered forward end 28 of the primary ferrule 8 wedges into the inward taper of the contact body tapered walls 44, to effectuate a relatively sealed interface. It will be appreciated from FIG. 3A that the internal annular flange 24 of the coupling nut 6 is intended for position in abutment against the external annular flange 36 of the contact body 10. It will further be noted that the external flange 22 of the crimping ferrule 4 abuts against the coupling nut 6, and entraps the sleeve of strength fibers 16 against the outer surface of the contact body 10.

Continuing, the forward length of the optical waveguide 20 protrudes forward through the forward bore chamber 46 and emerges from the forward end of the contact body 10. The subject optical connector at this stage in the procedure is illustrated in FIG. 3.

As shown by FIG. 5, a quantity of adhesive material 50 is injected into the forward bore chamber 46 of the contact body 10, and encapsulates the optical waveguide 20 extending therethrough. It will be readily appreciated that the wedging interference engagement between the tapered forward end 28 of the primary ferrule 8 and the tapered walls 44 of the contact body 10, prevents any migration of the adhesive material backward along the optical waveguide, and thereby serves to localize the collection of adhesive material at the forward end of the assembly where needed. The adhesive material 50 may be selected from the group of commonly available epoxy materials, or the like. Thereafter, the cylindrical body of ferrule 4 is crimped to securely clamp cable strength fibers 16 against the contact body 10.

Figure 6:
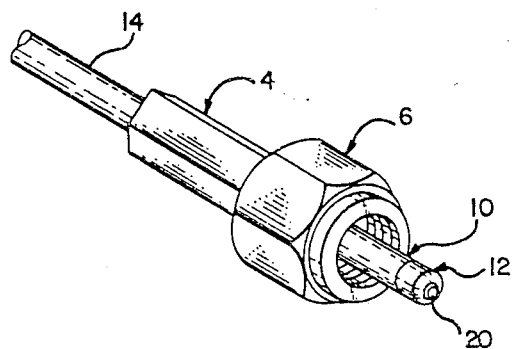
FIG. 6 is a perspective view of the subject optical waveguide connector in the fully assembled condition.

Proceeding with reference to FIGS. 5 and 6, the alignment ferrule 12 is then mounted over the forward nose portion 38 of the contact body 10, and establishes an interference engagement therewith. The interference protusions 40 embed into the resilient ferrule 12 to retain said alignment ferrule 12 over the contact body nose portion 38. At this point, the forward end of the optical waveguide 20 protrudes through the centering aperture 48 of the alignment ferrule 12, and is thereby held and positioned on the major axis of the assembly. Subsequently, the epoxy 50 is permitted to cure, and the forward end of waveguide 20 is ground and polished back coplanar with the forward end of the alignment ferrule 12. Thus, the optical waveguide 20 is referenced coaxially with the outer diameter of forward nose portion 38 of the contact body 10, by operation of the alignment ferrule 12 through which the waveguide protrudes. Such an arrangement ensures that the optical waveguide is fixedly held on a major axis of the connector assembly.

With continued reference to FIGS. 5 and 6, a coupling bushing 52 is illustrated for use in the mating of a pair of connectors configured as described above. The coupling bushing 52 is generally cylindrical and provides a centering bore 54 extending along the intermediate length thereof. The centering bore 54 has an interior dimension such that the alignment ferrule 12 may be inserted therein with interference engagement. An internal step 56 is further provided, to terminate the insertion of the contact body 10 into the centering bore 54. It will be apparent that the coupling nut 6 engages exterior threads 58 of the coupling bushing 52 to influence the contact body 10 further into the coupling bushing bore 54, until the external shoulder 37 of the contact body abuts against the internal step 56 of the bushing 52.

The internal dimension of the bore 54 is such that radially compressive force is exerted upon the alignment ferrule 12 as the contact body 10 is inserted into the bushing. Resilient radial compression of the ferrule 12, which is caused by interference engagement with bushing 52, serves to uniformly re-locate the forward nose portion 38 of the contact body 10 on the center axis of the coupling bushing. Thus, by operation of the resilient alignment ferrule 12, the forward nose portion 38 of the contact body 10 is positioned on the axis of the coupling bushing. Moreover, since the alignment ferrule 12 further serves to preserve the optical waveguide 20 in fixed coaxial reference with the outer surface diameter of the forward nose portion 38, the optical waveguide 20 is likewise thereby fixedly located on the axis of the coupling bushing 52. A like configured optical waveguide connector, structured identically as described above and illustrated in FIG. 5, is intended to be matingly inserted into the opposite end of the coupling bushing 52. The opposite mating connector half undergoes similar alignment by operation of the similar resilient alignment ferrule 12 component thereof, and is thereby positioned on the axis of the coupling bushing 52. Accordingly, both mating connector halves (only one of which can be seen in FIG. 5) are resiliently re-located to the axis of the coupling bushing, and the optical waveguides extending therethrough are thereby colinearly and axially aligned.

From the foregoing some general observances will become apparent. First the subject optical waveguide connector consists of relatively few component parts. A single splice bushing comprises the only component which is not identically incorporated into each connector half. Secondly, part-to-part tolerances between the component parts of each connector half and between the component parts of opposite connector halves, are not critical. This is due to the resilient operation of the alignment ferrules, which ensure coaxial location of the connector halves independently of the part-to-part specifications, and due to the controlled distance which each connector unit is inserted into a splice bushing. Also, it will be apparent that the subject invention may be economically produced due to the relatively small number of component parts which have non-critical dimensions, and can be readily assembled without the use of elaborate assembly tooling.

Finally, in viewing FIG. 5, it will be recognized that the waveguide is held on the major axis of the contact body 10 at two distinct and distant (emphasis added) points; namely at the forward end of the primary ferrule 8 where the waveguide protrudes therefrom, and at the alignment ferrule 12 where the forward end of the waveguide is held within the ferrule aperture 48. This distant two point alignment scheme achieves better angular alignment of the waveguide axis than a system which holds the waveguide at one point, or at two relatively proximate points.

What is claimed is:

1. An optical waveguide connector for connecting to an optical fiber of an optical waveguide member and for connection within a coupling member, comprising:
   contact body means having a forward section and a rear section, said contact body means having profiled passageway means extending therethrough, said profiled passageway means having a smaller diameter in said forward section, said profiled passageway means in said rear section adapted to receive an inner jacket surrounding the optical fiber and said smaller diameter profiled passageway means in said forward section receiving the optical fiber therein;
   said forward section having a forward end of smaller outer diameter than the outer diameter of said forward section;
   resilient and radially compressible alignment ferrule means having a centrally disposed aperture therethrough for closely receiving an end of the optical fiber therein with a forward end surface of the optical fiber located coplanar with a forward surface of said alignment ferrule means, said alignment ferrule means having a counterbore rearward of said aperture engaging said forward end of said forward section, the outer diameter of said alignment ferrule means being the same as the outer diameter of said forward section so that said forward section with said alignment ferrule means thereon is positionable within the coupling member with the alignment ferrule means resiliently engaging the coupling member thereby compressibly engaging the optical fiber end disposed in said aperture and aligning the axis of the optical fiber with the axis of the coupling member.

2. An optical waveguide connector as set forth in claim 1, wherein protrusion means are located on an outer surface of said forward end which embed into a surface defining said counterbore of said alignment ferrule means thereby retaining said alignment ferrule means on said forward end.

3. An optical waveguide connector as set forth in claim 1, wherein primary ferrule means having profiled bore means extending therethrough is disposable within said rear section passageway means with the inner jacket being disposed along a major portion of said primary ferrule means and the optical fiber extending along the remaining portion of said primary ferrule means and into said smaller diameter profiled passageway means of said forward section.

4. An optical waveguide connector as set forth in claim 3, wherein said profiled passageway means between said forward section and said rear section has a tapered section, said primary ferrule means has a tapered forward end matable with said tapered section, said tapered forward end includes a hole dimensioned closely to the diameter of the optical fiber enabling the optical fiber to pass therethrough.

5. An optical waveguide connector as set forth in claim 4, wherein adhesive means is disposable within said profiled passageway means in said forward section, said tapered forward end of said primary ferrule means matably engaging said tapered section of said profiled passageway means preventing said adhesive means from migrating beyond the matable engagement between said tapered forward end and said tapered section.

6. An optical waveguide connector as set forth in claim 3, wherein said primary ferrule means includes annular shoulder means to limit movement of said primary ferrule means into said profiled passageway means of said rear section.

7. An optical waveguide connector as set forth in claim 1, wherein strength fibers of the optical waveguide members are disposable along an outer surface of said rear section of said contact body means, and crimping ferrule means disposable onto said rear section and crimpable thereonto and onto an outer jacket of the optical waveguide member thereby securing the strength fibers between the rear section and said crimping ferrule means and providing a strain relief for the optical waveguide member.

8. An optical waveguide connector as set forth in claim 7, wherein said contact body means has an external annular flange, coupling means disposed on said contact body means and having an internal annular flange disposed adjacent said external annular flange, and said crimping ferrule means has annular flange means disposed adjacent said internal flange thereby securing said coupling means onto said contact body means between said external annular flange and said annular flange means with said coupling means being freely rotatable relative to said contact body means for coupling engagement with the coupling member.

9. An optical waveguide connector as set forth in claim 1, wherein said contact body means has an annular shoulder for engagement with an internal step in the coupling member thereby limiting movement of said forward section within the coupling member.

* * * * *